United States Patent [19]

Gardner et al.

[11] Patent Number: 5,131,678
[45] Date of Patent: Jul. 21, 1992

[54] INVISIBLE AIR BAG COVER DOOR

[75] Inventors: John A. Gardner, Nottingham; Richard D. Rhodes, Jr., Somersworth; Everett Hastings, Farmington, all of N.H.

[73] Assignee: Davidson Textron Inc., Dover, N.H.

[21] Appl. No.: 620,664

[22] Filed: Dec. 3, 1990

[51] Int. Cl.$^5$ .............................................. B60R 21/22
[52] U.S. Cl. .................................. 280/732; 264/465; 264/293
[58] Field of Search ............... 280/728, 730, 731, 732, 280/736, 740, 741, 743; 206/607, 612, 621.7; 264/46.5, 46.7, 154, 293

[56] References Cited

U.S. PATENT DOCUMENTS

| | | | |
|---|---|---|---|
| 3,274,047 | 9/1966 | Sloan | 264/293 |
| 4,148,503 | 4/1979 | Shiratori | 280/731 |
| 4,900,489 | 2/1990 | Nagase | 264/46.5 |
| 4,901,359 | 2/1990 | Bruder | 382/8 |
| 4,911,471 | 3/1990 | Hirabayashi | 280/732 |

FOREIGN PATENT DOCUMENTS

| | | | |
|---|---|---|---|
| 3315535 | 3/1984 | Fed. Rep. of Germany | 280/732 |
| 3904977 | 1/1990 | Fed. Rep. of Germany | 280/743 |
| 1-122753 | 5/1989 | Japan | 280/743 |
| 2228235 | 8/1990 | United Kingdom | 280/728 |

Primary Examiner—Charles A. Marmor
Assistant Examiner—Karin Tyson
Attorney, Agent, or Firm—John C. Evans

[57] ABSTRACT

A vehicle steering wheel has a decorative panel concealing a storage compartment for an inflatable air bag. The panel has a covering which comprises a backing plate having a U-shaped cut line framing the storage compartment and defining a cover door having a hinge line connecting the ends of the cut line U. An inner layer of foam is interposed between the backing plate and an outer skin layer. The skin has a peripheral groove outlining the door and comprises a hinge section overlaying the hinge line and a weakened tear seam line overlying the cut line. The groove is cut through at the bottom along the tear seam line but not along the hinge section. Inflation of the air bag will force the door outwardly, fracturing the foam layer along the tear seam line to swing the door away from the opening about the hinge section to enable deployment of the air bag outwardly of teh panel. The cuts in the panel layers can be made before or after a molding process. Alternate constructions creating the tear seam line are disclosed.

7 Claims, 2 Drawing Sheets

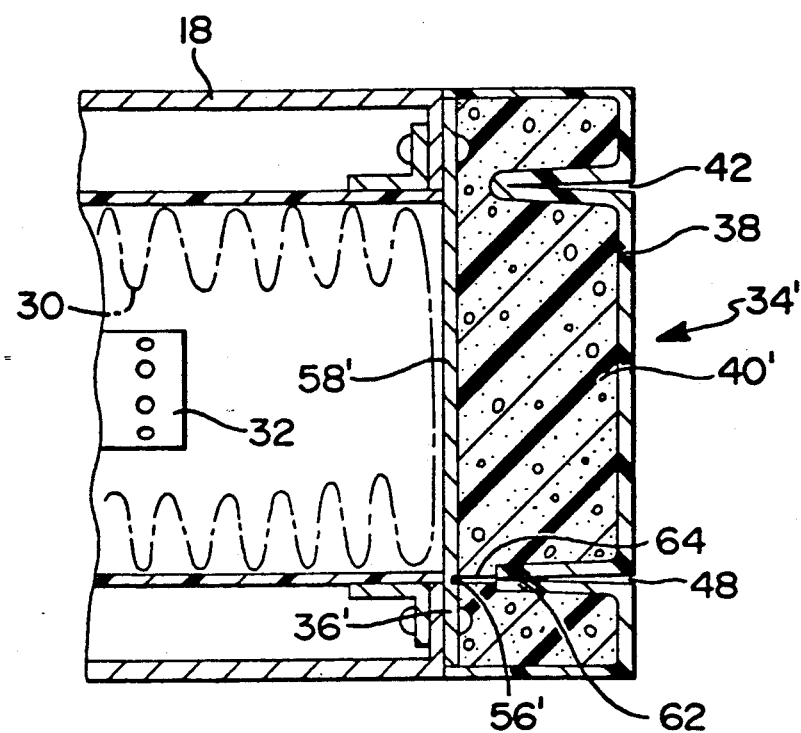
FIG 3
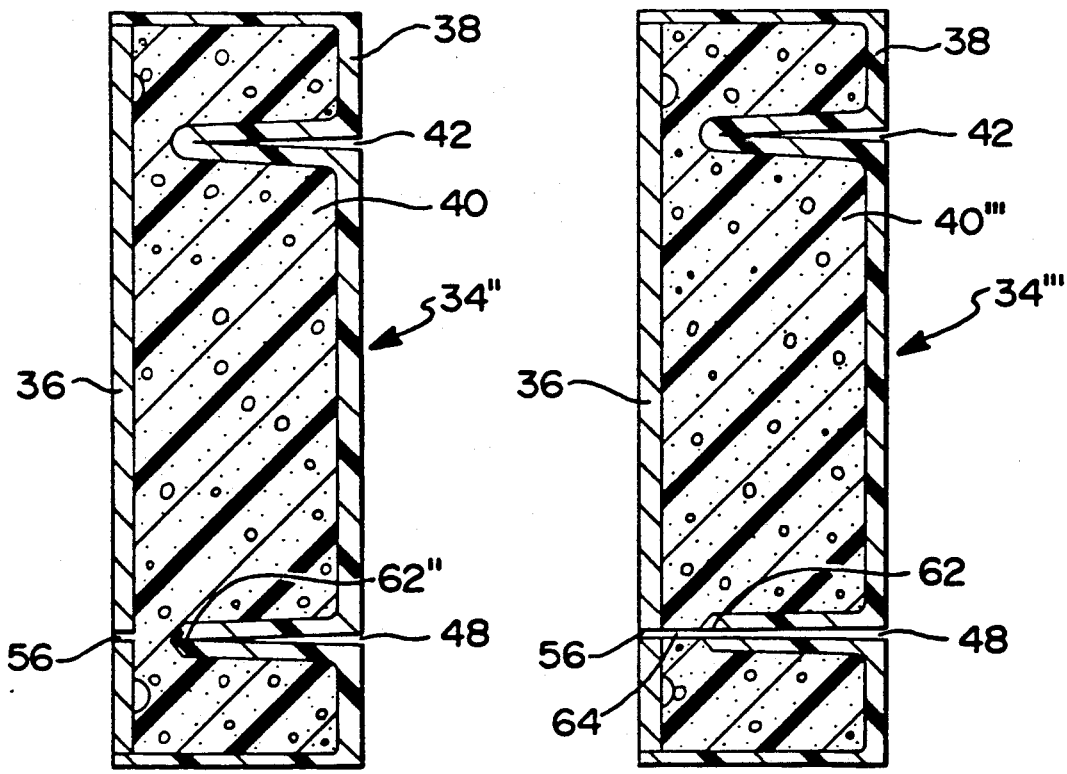
FIG 4
FIG 5

INVISIBLE AIR BAG COVER DOOR

FIELD OF THE INVENTION

This invention relates generally to decorative panels having functional opening requirements including free deployment in temperature ranges from −40° F. to +200° F. and without fragmentation while covering air bag storage compartments in passenger vehicles and, more particularly, to a deployment door formed in such a panel covering the storage compartment.

BACKGROUND OF THE INVENTION

An increasing number of passenger vehicles manufactured today are equipped with supplemental inflatable restraints for vehicle occupants; these are commonly known as air bags. Currently, the air bag provided for the vehicle driver is mounted in a storage compartment located in the vehicle steering column. The air bag for the front seat passenger is located in the vehicle dash board.

It is conventional for the steering wheel hub or for the dash board to incorporate a door formed into a decorative panel. This door is normally rectangular for driver's side installations and for mid-mounted doors on instrument panels. The doors can be shaped to consistent with an instrument panel for top mounts. The door is separate from the surrounding panel area so that it can be swung open by the deploying air bag upon inflation.

Some of these air bag doors comprise a portion of the panel defined by a tear seam line of weakened panel material along three sides of the door including tear seams defined by channel segments, V-segments, cross V-segments, double channel segments, and star segments. This tear seam is fractured by the inflating air bag so that the door swings open about its fourth side, which functions as a hinge, to enable the air bag to properly deploy.

All too frequently, the tear seam outlining the door is visually perceptible to vehicle occupants. This visible door detracts from the interior styling of the vehicle and is a definite styling drawback, especially in the more expensive vehicles.

It is quite desirable to provide a decorative panel for a vehicle interior which incorporates a door covering the air bag storage compartment that forms part of the styling contours of the vehicle interior and is consequently visually imperceptible to occupants of the vehicle.

SUMMARY OF THE INVENTION

Accordingly, it is an object of this invention to provide an air bag door that is visually imperceptible to vehicle occupants.

In accordance with this invention, a vehicle passenger compartment has a decorative panel concealing a storage compartment for an inflatable air bag. The panel has a covering which comprises a backing plate having a U-shaped cut line framing the storage compartment and defining a cover door having a hinge line connecting the ends of the cut line U, an inner layer of foam overlying the backing plate, and an outer skin layer adhered to the foam layer. The skin has a peripheral groove outlining the door and comprises a hinge section overlying the hinge line and a weakened section overlying the cut line. The groove is characterized by a diminished skin thickness at the bottom thereof along the tear seam line and an undiminished thickness along the hinge section. Inflation of the air bag will force the door outwardly, fracturing the panel along the tear seam line to swing the door away from the opening about the hinge section to enable deployment of the air bag outwardly of the panel.

Preferably, the frangible section comprises a slit completely through the skin at the bottom of the groove so as to be substantially visually imperceptible to occupants of the vehicle passenger compartment.

A preferable method of making the panel is by forming a vinyl skin having a deep draw or casting a vinyl skin having a sharp V-groove to create a groove defining a door, forming a backing plate having a cut line partially around the door, placing the backing plate and skin in a mold in spaced relationship, creating a foam layer in situ adhering to the skin and the backing plate to create the panel, removing the formed panel from the mold, and severing the skin at the bottom of the portion of the groove overlying the cut line to create a frangible section.

A better understanding of the invention can be obtained by reference to the following detailed description, taken in conjunction with the accompanying illustrative drawings, wherein:

DRAWING DESCRIPTION

FIG. 3 is a view similar to FIG. 2, showing another embodiment of this invention;

FIG. 4 is an enlarged view similar to a portion of FIG. 2, illustrating yet another embodiment of this invention; and FIG. 5 is a view similar to FIG. 4, illustrating still another embodiment of this invention.

DETAILED DESCRIPTION OF THE INVENTION

Figure 1:
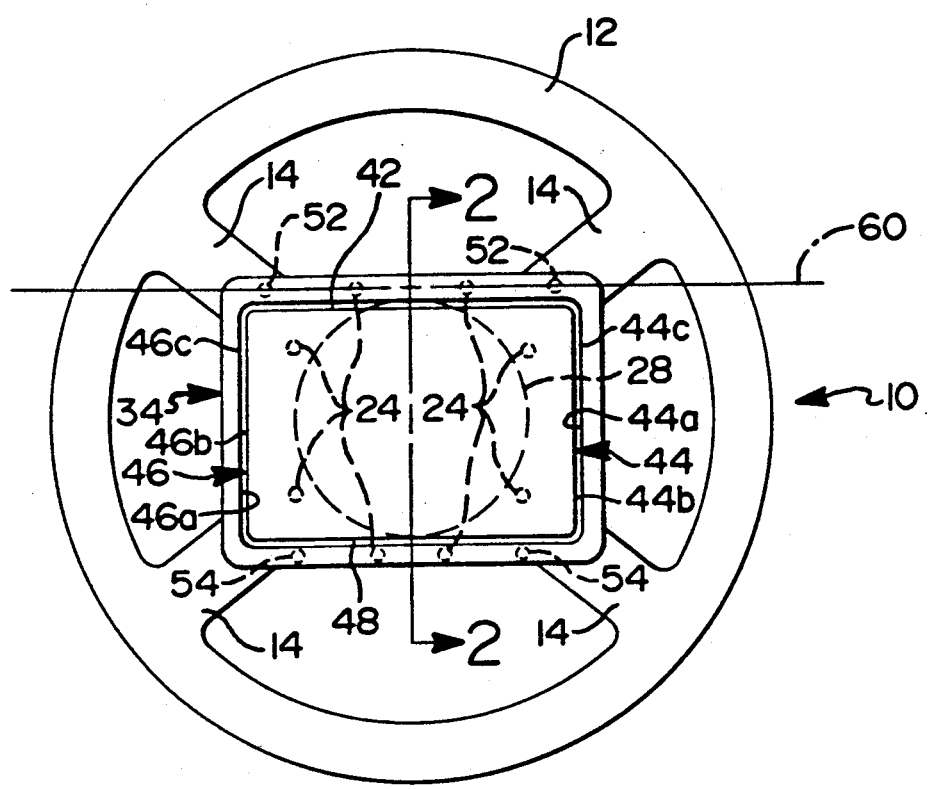
FIG. 1 is a plan view of a vehicle steering wheel having a decorative panel concealing an inflatable air bag and formed in accordance with this invention.
Figure 2:
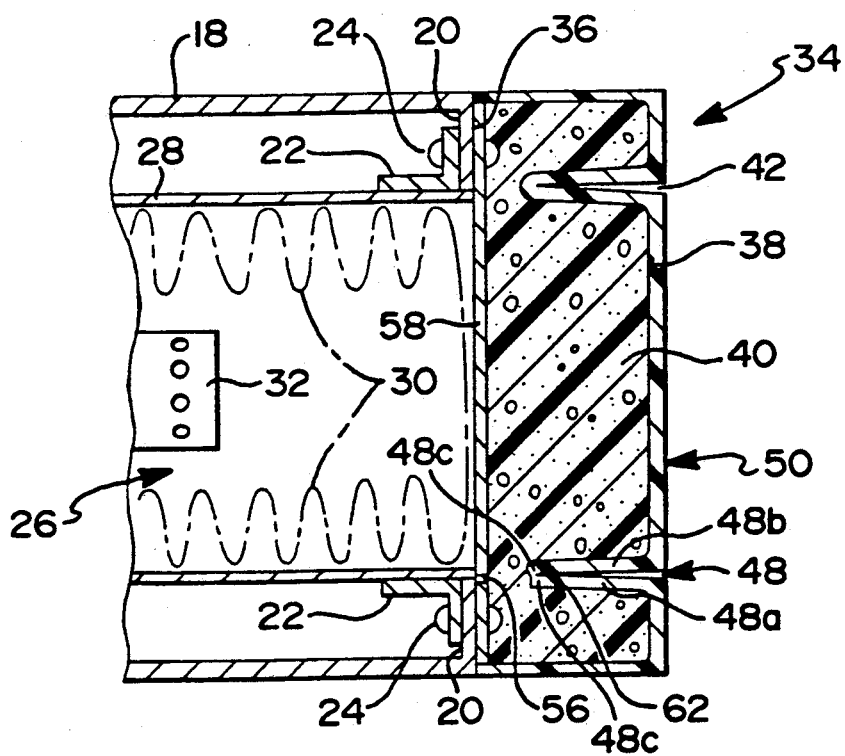
FIG. 2 is a sectional view of the panel shown in FIG. 1, taken along line 2—2 of FIG. 1, showing a preferred embodiment of this invention.

Referring now to FIGS. 1 and 2 of the drawings, a vehicle steering wheel assembly denoted 10 comprises a steering wheel rim 12 which is conventionally supported by four spokes 14 on a steering column (not shown) rearwardly of a hub assembly 16.

The hub assembly comprises a rectangular metal support shell 18 that includes inwardly turned flanges 20. A flanged circular metal collar 22 is attached to the flanges 20 by rivets 24 or other conventional fasteners.

An air bag assembly 26 includes an open-ended cylindrical metal container 28 that serves as a storage compartment for a deflated air bag 30. Container 28 also houses an inflating mechanism 32 for quickly inflating the air bag 30 in a conventional manner.

Flanges 20 also mount a decorative panel 34 which conceals air bag assembly 26. Panel 34 comprises an inner aluminum backing plate 36, an outer flexible vinyl skin 38 and an intermediate resilient foam layer 40 which can be formed of a polyurethane resin. These materials are merely exemplary and form no part of this invention.

The surface of skin 38 features a continuous decorative rectangular deep and narrow groove composed of an upper segment 42, side segments 44, 46 and a lower segment 48. The groove frames the opening in air bag storage container 28 and defines a door 50.

As illustrated in FIG. 2, panel 34 is mounted on support 18 via rivets 24 which attach backing plate 36 to flanges 20. As shown in FIG. 1, additional rivets 52, 54 are provided to mount backing plate 36. Backing plate 36 contains a U-shaped cut line 56 which underlies skin groove segments 44, 46 and 48, creating a flap 58 which is coextensive with and further defines door 50. Aligned upper rivets 24 and 52 define a hinge line 60 for door 50, as will be later described.

Referring especially to FIG. 2, bottom groove 48 and side grooves 44, 46 are cut through to foam layer 40 at 62. They each have side walls 48a, 48b; 44a, 44b; 46a, 46b. Each side wall has an end portion 48c, 44c and 46c separated from each other by a slit cut 62. This cut is coextensive with support panel cut line 56. Upper groove 42, which overlies hinge line 60 remains uncut. Since this cut is located at the bottom of a deep, narrow groove, it is imperceptible to vehicle passengers. The uncut layer of foam provides some support should external pressure be placed on panel 34.

Operation will now be described. Upon a predetermined vehicle impact, inflating mechanism 32 will suddenly and forcefully begin inflating air bag 30. The force of the inflating bag will exert increasing pressure on the bottom of flap 58 which will fracture the foam layer between cut line 56 and the cut skin groove segments 44, 46, 48. This frees door 50 to swing upwardly about hinge line 60, out of the path of the deploying air bag 30.

By providing a weakened section in panel 34 through the cut line in the backing plate and the cut skin groove sections, a predetermined and predictable tear seam line is established. The door will always open through these weakened sections.

The panel 34 can be manufactured by many methods, including bonding discrete layers of foam, skin and backing plate together. However, a preferred method of manufacture is as follows. A preformed or cast thermoplastic skin 38 and pre-cut backing plate are placed in a mold in spaced relation, with cut line 56 taped. Intermediate layer 40 is then foamed in place. The cut at the bottom of groove segments 44, 46, 48 can then be made while panel 34 is in the mold or after removing it from the mold. Techniques for performing the cut include hot knife and water jet.

FIG. 3 illustrates another embodiment of this invention. In this and following embodiments, those items corresponding to similar items in the FIG. 2 embodiment are identified with primed numerals. Identical items carry the same numerals.

Panel 34' has a backing plate 36, that has a cut line 56' that does not extend completely through plate 36'. Thus, cut line 56, comprises a weakened section of the backing plate which will fail upon inflation of the air bag to create flap 58'. This embodiment also features an extension 64 of the skin cut 62, which further defines the line of panel failure to create door 50 upon air bag inflation.

The panel 34' is constructed by placing an uncut backing plate and skin layers in the mold, forming the foam layer in situ, and thereafter cutting the panel completely through the skin at end portions 48c and foam layers and partially through the backing plate. The resultant panel is as illustrated in FIG. 3.

Further embodiments are shown in FIGS. 4 and 5. Panel 34" of FIG. 4, has a backing plate 36 which contains a through cut line 56 and foam layer 40 is uncut, as in FIG. 1. Skin grooves 44, 46 and 48 are only partially cut at 62" to create a weakened skin section along a predictable tear line. This weakened section could also be accomplished by stitching through the skin at the bottom of the skin grooves by stitching 63 joining the spaced end portions 48c. This weakening method would be applicable if a wider groove were used to provide stitching as a decorative trim feature.

In FIG. 5, panel 34''' contains a continuous cut completely through the panel at end portions 48c, 44c and 46c comprising cuts 62, 64 and cut line 56. This panel can have all of its cuts formed after molding. Of course, any of the illustrated embodiments can be formed of discrete layers adhesively attached.

The embodiments of FIGS. 2, 3 and 4 all feature an incompletely cut tear seam line which will provide some resistance to deformation due to external pressure. All of the embodiments prevent inward deflection of the door portion of the decorative panel since the door area overlaps the opening of the air bag storage container.

Although this invention has been illustrated in a steering wheel environment to serve as an inflatable restraint for a vehicle driver, it is equally applicable to a dash board or seat back mounting for an inflatable restraint for front and rear seat passengers.

The passenger side of the pad can be either top or mid-mounted. The shell portion can be cast from liquid plastisol. Alternatively, the shell can be preformed from plastic sheet stock. Blow molding or injection molding can also be used (molded). The cast and forming will naturally cause a thin (weakened) section at the groove or tear seam.

I claim:

1. In a vehicle passenger compartment, a decorative panel concealing a storage compartment for an inflatable air bag, comprising:
   a backing plate having a U-shaped cut line forming the storage compartment and defining a door having a hinge line extending between the ends of the cut line,
   an inner layer of foam overlying the backing plate,
   an outer skin layer forming the outside surface of the decoration panel adhered to the foam layer, the skin having a peripheral groove outlining the door comprising a hinge section and a weakened section, the groove being characterized by two spaced side walls extending from the outer surface of said outer skin layer inwardly of said foam and each of said spaced side walls having end portions thereon completely separated throughout the full extent of the groove by a slit cut therebetween; said spaced side walls extending downwardly within more than half of the depth of the decorative panel so as to cause said slit to be located within said foam layer to form a weakened section at a point which is not visually observable from the outer surface of said outer skin layer and the outside surface of the decorative panel to create a tear seam line along the weakened section so that inflation of the air bag will force the door to separate said spaced side walls and swing the door away from the opening about the hinge section to enable deployment of the air bag outwardly of the panel.

2. The panel of claim 1, further characterized by the door being generally quadrangular with the hinge section forming one side and the weakened section forming the other three sides of the quadrangle.

3. A method of forming a composite decorative panel for concealing an inflatable air bag comprising the steps of
   forming a vinyl skin having an outer surface and a pair of spaced walls extending from said outer surface joined at the ends thereof at a depth that will conceal the joined ends to create a groove defining a door,
   forming a backing plate,
   placing the backing plate and skin a mold in spaced relationship and with the joined ends located in a spaced relationship with the backing plate that is less than half the thickness of the composite decorative panel;
   forming an intermediate foam layer in situ adhering to the skin and the backing plate to create the composite panel, and
   cutting through said joined ends and said foam layer to create an open tear seam line completely through said skin and said foam layer along the full extent of the groove, while leaving a hinge portion unsevered.

4. The method of claim 3, wherein the skin is severed by a water jet.

5. The method of claim 3, wherein the skin is severed by a hot knife or hot knife die.

6. The method of forming a composite decorative panel of claim 3 wherein said cutting step includes the steps of:
   sequentially severing the joined ends and the foam following the foam forming step and partially severing the backing plate to form the open tear seam line.

7. In a vehicle passenger compartment, a decorative panel concealing a storage compartment for an inflatable air bag, comprising:
   a backing plate having an open-ended cut line defining a door having a hinge line extending between the ends of the cut line,
   an inner layer of foam overlying the backing plate,
   an outer skin layer adhered to the foam layer, the skin having a peripheral groove outlining the door comprising a hinge section and a tear seam line section, the groove being characterized by a weakened skin section at the bottom thereof extending along a portion thereof overlying the cut line to form the tear seam line and an unweakened section overlying the hinge section and said weakened skin section comprising a section of stitching, whereby inflation of the air bag will force the door to fracture the weakened section and swing the door away from the opening about the hinge section to enable deployment of the air bag outwardly of the panel.

* * * * *